Patented Aug. 28, 1945

2,383,859

UNITED STATES PATENT OFFICE 2,383,859

CAPILLARY ACTIVE AGENTS

Winfrid Hentrich, Dessau-Rosslau, and Heinz-Joachim Engelbrecht and Erik Schirm, Dessau, Germany; vested in the Alien Property Custodian No Drawing. Application June 14, 1941, Serial No. 398,106. In Germany July 5, 1940

2 Claims. (Cl. 260—556)

This invention relates to capillary active agents and process of making same.

We have found that valuable capillary active agents may be produced by treating organic compounds which comprise in the molecule at least one sulphamide group and at least an aliphatic residue comprising three or more carbon atoms with acylating agents.

When carried out this proces, aliphatic, cyclo-aliphatic or aromatic sulphamides or mixed types of these series comprising at least an aliphatic residue having three or more carbon atoms may be used as original materials. The hydrocarbon residues of the sulphamides may also comprise oxygen, sulphur or nitrogen in the form of substituents or of hetero-atoms or groups of hetero-atoms. For instance, the hydrocarbon atoms may be interrupted by atoms of oxygen, sulphur or nitrogen and especially comprise $CO.O$, $O.CO$, $NH_2$, $CO.NH$, $NH.CO$, $SO_2$, $SO.NH$, $NH.SO_2$, $CO.NH.SO_2$, $SO_2.NH.SO_2$ groups.

As examples of such sulphamides may be mentioned: propyl-sulphamide, hexyl-sulphamide, isooctyl-sulphamide, dodecyl-sulphamide, hexadecyl - sulphamide, monochloroctadecyl - sulphamide, octadecenyl - sulphamide, lauroyl - oxyethane-sulphamide, oleoyl-methyl-amino-ethane-sulphamide, γ-octyl - oxypropyl - sulphamide, 4-sec. - butyl - cyclohexyl - sulphamide, diisobutyl-cyclohexyl-sulphamide, naphthenyl-sulphamide, isopropyl- or isobutyl-naphthalene-sulphamides, tetrahydronaphthalene - β - sulphamide, hexadecyl-benzol-sulphamide, 3 - caproyl-amino-benzol-sulphamide, 3-n-octyl-sulphamino - 4 - chlor-benzol-sulphamide, 3-n-tetradecyl-urea - benzol-sulphamide, 3-hexadecyl-urethane-benzol-sulphamide, 3 - diisobutyl - naphthyl-sulphamino-benzol-sulphamide and the like.

According to our present invention acylating agents are caused to act on these sulphamides or their salts, especially their alkali salts. Such acylating agents are carboxylic acid halides, carboxylic acid anhydrides, chlorated carboxylic acid esters and chlorides of urea.

Suitable carboxylic acid halides or anhydrides are for instance acetyl-chloride, acetic acid anhydride, phenoxy-acetyl-chloride, 4-isooctyl-phenoxy-acetyl chloride, butyric acid chloride, higher molecular fatty acid halides and their substitution products, pyromucic acid chloride, naphthenic acid chlorides, benzoyl chloride, benzoic acid anhydride, o-cresylic acid chloride, pyridine- or chinoline carboxylic acid anhydrides, oxalyl chloride, succinic acid chloride, adipic acid chloride, therephthalic acid chloride, naphthalene-1,5-dicarboxylic acid chloride, thiodiglycolic acid chloride, diglycolic acid chloride, diglycolic acid anhydride, phthalic acid anhydride, isatoic acid anhydride and the like.

In a similar way also chlorocarboxylic acid esters of aliphatic or cyclo-aliphatic hydroxyl compounds may be used, such as chlorocarboxylic acid hexyl ester, chlorocarboxylic acid dodecyl ester, chlorocarboxylic acid methyl cyclohexyl ester and the like as well as urochlorides, such as for instance octyl urochloride, oleyl urochloride, benzyl urochloride, didodecyl urochlorides, dodecyl methyl urochloride and the like.

The hydrocarbon residues of the acylating agents pertaining to the aliphatic, cyclo-aliphatic or aromatic series or mixed types of these series may also comprise known hetero-atoms or groups of hetero-atoms, such as oxygen, sulphur, nitrogen, ester groups, carbonamide groups, sulphonamide groups and the like or substituents, such as halogen, hydroxyl groups, nitro groups and the like.

The reaction which is caused by the acylating agents takes place in accordance with methods that are known, optionally in the presence of indifferent organic solvents or, if salts of the sulphamides are used also in an aqueous medium. If necessary, the temperature may be increased to bring about the reaction and kept at 100° and higher to complete the reaction; furthermore there may be used as far as necessary agents able to bind acid or water. As solvents which at the same time act binding on acid, pyridine may for instance be used.

For the production of sulphamides which comprise carbonamide groups, such as for instance the 3-(capryloyl-amino)-benzol-sulphamide, the process may also be conducted in a modified way by using for instance the corresponding amino-alkyl- or amino-aryl sulphamides as original material and performing the acylation simultaneously on the amino group and on the amide group.

The capillary active agents produced by the process forming part of our present invention are of the general formula $R.SO_2.NH.CO.R'$. In this formula R denotes any desired organic residue consisting of an aliphatic residue comprising three or more carbon atoms or containing an aliphatic residue comprising three or more carbon atoms. The residue R, accordingly, may be of aliphatic, as well as of cyclo-aliphatic or aromatic nature, but must always comprise an aliphatic residue having three or more carbon atoms. The residue R may also comprise oxygen, sulphur or nitrogen in the form of substituents or of hetero-atoms or groups of hetero-atoms. For instance, the hydrocarbons may be interrupted by atoms of oxygen, sulphur or nitrogen and may especially also comprise: CO.O, O.CO, NH$_2$, CO.NH, NH.CO, SO$_2$.NH, NH.SO$_2$, CO.NH.SO$_2$, SO$_2$.NH.SO$_2$ groups.

The residue R' denotes any desired organic residue, for instance an alkyl-, cycloalky-, aralkyl- or aryl-residue which may eventually be substituted. The residue R' may also comprise hetero-atoms or groups of hetero-atoms, such as oxygen, sulphur, nitrogen, ester groups, carbonamide groups, sulphonamide groups or substituents, such as for instance halogen, hydroxyl groups, nitro groups and the like.

Compounds that may be obtained by the process forming part of our present invention are as follows: N-capronoyl-butyl-sulphamide, N-capronoyl-octyl-sulphamide, N-acetyl-lauryl-sulphamide, N-acetyl-diisobutyl-naphthalene-sulphamide, N-propionyl-oleoyl - methyl - amino-ethane - sulphamide, N - naphthenoyl - octadecenyl-sulphamide, N-(3-lauroyl-amino-benzol-sulphonyl)-benzamide, N-benzoyl - n - dodecane-sulphamide, mixtures of isomeric N-acetyl-diisobutyl-naphthalene-sulphamides, N - capryloyl - hexyl-sulphamide, N-caprinoyl-octyl-sulphamide, N-(3-capronoyl-amino-benzol - sulphonyl) - capronoyl-amide, N-(3-capryloyl-amino-benzol-sulphonyl) - capryloyl-amide, N-(3 - caprinoyl-amino-benzol-sulphonyl)-caprinoyl-amide, and the like.

These compounds possess surface active properties and show a considerable deterging, frothing, emulsifying and wetting ability, even if the hydrocarbon residues R or R' contained therein are relatively still low-molecular. It is emphasized that the optimum of the deterging property is present in such compounds in which the residues R or R and R' have about from 6 to 10 carbon atoms and are mainly of aliphatic nature. The compounds may advantageously be used for all deterging, cleaning, wetting, dispersing and emulsifying processes, such as are customary in the textile and washing industry, in the fur industry, in the leather industry and the like. The products may be used as such or also in combination with known washing and cleaning agents or additions to such agents.

Products of condensation have already been made by introducing higher molecular fatty acid residues into aromatic sulphamides, for instance into the p-toluol-sulphamide and it has been stated that these compounds are suitable for the making of washing agents. As compared with these known compounds the products of condensation obtained by the process forming part of our present invention possess a better solubility in water and are of superior character as regards their surface active properties and especially as regards their washing properties. Above all, compounds with relatively low molecular fatty residues are likewise possessed of excellent washing properties.

Example 1

250 parts by weight of n-dodecane sulphamide and 145 parts by weight of benzoyl-chloride are heated to a temperature of 100° until the incipient lively development of hydrochloric acid ceases. Thereupon the temperature is slowly raised to 140° and the reaction mixture kept at this temperature, until hydrochloric acid will no more be given off. Now the mixture is cooled and the solidified mass re-dissolved in 800 to 850 parts by volume of benzene of a boiling point from 70 to 80°. There will be obtained about 290 parts by weight of N-benzoyl-n-dodecane-sulphamide (=82% of theoretical) in the form of a colorless crystalline powder with melting point at 77°. The powder dissolves clear in water by adding the necessary amount of soda, especially when applying heat; the solution is heavily frothing and possessed of a better washing property than a solution of N-lauryl-benzol-sulphamide of the same concentration.

Example 2

34 parts by weight of the sodium compound of a technical diisobutyl-naphthalene-sulphamide mixture are suspended in 170 parts by weight of toluol. Thereupon 8 parts by weight of acetyl chloride are stirred into the mixture at ordinary temperature. The reaction mixture is heated, using reflux, to boiling temperature until the acetyl-chloride has been consumed. Now the toluol is blown off by steam, the residual aqueous liquid, which should amount to about 500 parts by volume, is adjusted to be slightly basic, as indicated by the litmus test, filtered to remove small quantities of undissolved constituents, the filtrate strongly acidulated with hydrochloric acid and in order to complete the precipitation 125 parts by weight of common salt are added. The amorphous yellowish precipitate which is a mixture of isomeric N-acetyl-diisobutyl-naphthalene-sulphamides is filtered and dried. In a soda alkaline solution the product is an excellent wetting agent.

Instead of the acetyl chloride also acetic acid anhydride may be used. Similar substances are obtained, if monochloracetyl-chloride, chloracetic acid anhydride or chlorocarboxylic acid-isobutyl ester is used instead of the acetyl chloride or acetic acid anhydride.

Example 3

3 parts by weight of 3-capryl-amino-benzol-sulphamide, 2 parts by weight of caproic acid chloride and 10 parts by weight of xylol are heated to boiling temperature, using reflux, until the development of hydrochloric acid ceases. Thereupon the xylol is blown off with water with water steam or removed by distillation at considerably decreased pressure. The residual mass which consists mainly of a product of condensation of the formula:

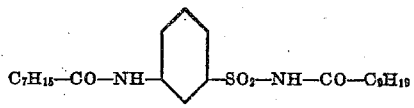

easily dissolves in warm diluted soda solution, while heavily frothing.

In like manner for instance β-(oleyl-methyl-amino-) ethane-sulphamide may be condensed with caproic-, octyl-, capric-, lauryl-, or oleic acid chloride.

Example 4

5 - stearyl - amino - benzol-1.3-disulphamide is boiled, using reflux, with five times the amount of acetic acid anhydride, until acetylation is completed. Thereupon the formed acetic acid and the excessive acetic acid anhydride is removed by distillation, preferably at reduced pressure. The residue dissolves in a warm diluted soda solution, while heavily frothing, the same as the products according to the previous examples.

Example 5

86 parts by weight of metanil amide are dissolved in 1000 parts of water by adding 20 parts by weight of sodium hydroxide. A mixture of 180 parts by weight of caprylic acid chloride and 180 parts by volume of acetone is slowly stirred into the solution which had been cooled down to about 2°. During stirring the temperature is kept at 2 to 5° and, as soon as the alkaline reaction ceases, sodium lye is gradually added so that phenol-phthalein paper will steadily be colored slightly pink. Upon introduction of the caprylic acid chloride at freezing temperature there is observed no further conversion due to the mixture becoming neutral, the mass is gradually heated to 50° and eventually further amounts of sodium lye are added so that there is finally obtained a solution which remains permanently alkaline in warm condition. The solution which may eventually be clarified by filtration is now acidulated with hydrochloric acid and the precipitate thus formed filtered and dried. Caprylic acid which may adhere to the solution may be removed by washing with benzene. The obtained product of condensation is of the formula:

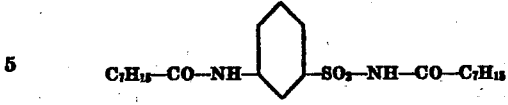

This product dissolves on heating with diluted soda solution, while frothing. All temperatures are given on the centigrade scale.

We claim:

1. A new capillary active diacyl imide, N-benzoyl-n-dodecane-sulphamide.

2. A process for producing a capillary active normal N-benzoyl-n-dodecane-sulphamide which comprises reacting n-dodecane-sulphamide and benzoyl-chloride by heating together at approximately 100° C. until no more hydrochloric acid is evolved, then raising the temperature to approximately 140° C. to complete the evolution of hydrochloric acid, cooling, dissolving in benzene and recrystallizing.

WINFRID HENTRICH.
HEINZ-JOACHIM ENGELBRECHT.
ERIK SCHIRM.